US011563251B2

(12) United States Patent
Nakamoto et al.

(10) Patent No.: US 11,563,251 B2
(45) Date of Patent: Jan. 24, 2023

(54) BATTERY MODULE (71) Applicant: VEHICLE ENERGY JAPAN INC., Hitachinaka (JP)

(72) Inventors: Masayuki Nakamoto, Hitachinaka (JP); Takayuki Nakajima, Hitachinaka (JP)

(73) Assignee: VEHICLE ENERGY JAPAN INC., Ibaraki (JP)

( * ) Notice: Subject to any disclaimer, the term of this patent is extended or adjusted under 35 U.S.C. 154(b) by 318 days.

(21) Appl. No.: 16/954,280

(22) PCT Filed: Nov. 19, 2018

(86) PCT No.: PCT/JP2018/042602
§ 371 (c)(1),
(2) Date: Jun. 16, 2020

(87) PCT Pub. No.: WO2019/123930
PCT Pub. Date: Jun. 27, 2019

(65) Prior Publication Data
US 2021/0083243 A1    Mar. 18, 2021

(30) Foreign Application Priority Data

Dec. 18, 2017 (JP) .............................. JP2017-241753

(51) Int. Cl.
*H01M 10/6554* (2014.01)
*H01M 50/20* (2021.01)

(52) U.S. Cl.
CPC ....... *H01M 50/20* (2021.01); *H01M 10/6554* (2015.04)

(58) Field of Classification Search
CPC ............ H01M 50/20; H01M 10/6554; H01M 50/209; H01M 50/264; H01M 50/291;
(Continued)

(56) References Cited

U.S. PATENT DOCUMENTS

2013/0244069 A1    9/2013 Horii et al.
2014/0120391 A1    5/2014 Park
(Continued)

FOREIGN PATENT DOCUMENTS

JP    2014-010983 A    1/2014
JP    2015-005362 A    1/2015
(Continued)

OTHER PUBLICATIONS

JP 2015-220218 machine English translation (Year: 2015).*
(Continued)

*Primary Examiner* — Michael L Dignan
(74) *Attorney, Agent, or Firm* — Volpe Koenig (57) ABSTRACT

A battery module including a plurality of battery cells that prevents the movement of the battery cells due to impact and has excellent cooling performance of the battery cells includes a battery cell group including a laminate of a plurality of flattened rectangular battery cells stacked in a thickness direction of the battery cells, and a housing storing the battery cell group. The battery cell group includes a plurality of cell holders configured to hold the individual battery cells from both sides in the thickness direction, and a plurality of side plates disposed at both ends of the plurality of battery cells in a width direction via the plurality of cell holders. Each of the cell holders has a restriction portion configured to restrict movement of the corresponding battery cell in a direction intersecting the thickness direction, and fixing portions that engage with the side plates.

9 Claims, 11 Drawing Sheets (58) Field of Classification Search
CPC . H01M 50/202; H01M 10/613; H01M 10/647
See application file for complete search history.

(56) References Cited

U.S. PATENT DOCUMENTS

| | | |
|---|---|---|
| 2014/0295227 A1 | 10/2014 | Aoki |
| 2016/0149180 A1 | 5/2016 | Tokoo et al. |
| 2018/0138560 A1 | 5/2018 | Bessho |
| 2018/0151859 A1* | 5/2018 | Aizawa ................ H01M 50/35 |

FOREIGN PATENT DOCUMENTS

| | | | | |
|---|---|---|---|---|
| JP | 2015-220218 | * | 12/2015 | .............. H01M 2/10 |
| JP | 2015-220218 A | | 12/2015 | |
| JP | 2017-010879 A | | 1/2017 | |
| JP | 2017-084467 A | | 5/2017 | |
| WO | 2013/073046 A1 | | 5/2013 | |
| WO | 2013/080338 A1 | | 6/2013 | |
| WO | WO 2014/013198 | * | 1/2014 | ............ H01M 10/04 |
| WO | 2017/006763 A1 | | 1/2017 | |
| WO | 2017/017914 A1 | | 2/2017 | |

OTHER PUBLICATIONS

WO 2014-013198 machine English translation (Year: 2014).*
International Search Report, PCT/JP2018/042602, dated Mar. 19, 2019, 2 pgs.
Extended European Search Report dated Aug. 5, 2021 for European Patent Application No. 18890938.6.
Chinese Office Action dated Mar. 28, 2022 for Chinese Patent Application No. 201880089273.4.

* cited by examiner

BATTERY MODULE

TECHNICAL FIELD

The present invention relates to a battery module including a plurality of battery cells.

BACKGROUND ART

Conventionally inventions about an assembled battery including the laminate of a desired number of secondary batteries have been known (see Patent Literature 1 described below). The invention described in Patent Literature 1 discloses an assembled battery having the following configuration to provide an assembled battery with improved reliability against an impact from an external force.

The assembled battery of Patent Literature 1 includes a battery cell group, a pair of first cover members, and a pair of second cover members. The battery cell group includes the laminate of a plurality of batter cells stacked in the thickness direction, each battery cell having a flattened battery body including a power-generating element and an electrode tab extending from the battery body. This assembled battery includes a heatsink disposed at least at one place between adjacent battery cells to radiate heat generated during the operation of the battery cells. The pair of first cover members covers the battery cell group from both sides in the stacking direction of the battery cells.

The pair of second cover members covers the battery cell group from both sides in the direction intersecting the stacking direction and the extending direction of the electrode tabs. This pair of second cover members joins to the pair of first cover members that presses the battery cell group in the stacking direction. Between at least one of the second cover members and the heatsink, the assembled battery has a restriction portion that restricts movement of the heatsink in a planar direction where the battery cells extend.

CITATION LIST

Patent Literature

Patent Literature 1 JP 2017-084467 A

SUMMARY OF INVENTION

Technical Problem

Patent Literature 1 describes, "the restriction of the movement by the restriction portion affects not only to the heatsink but also to the battery cell group including the heatsink." If the assembled battery receives an impact so that the battery cells making up the battery cell group move, excessive stress may act on the joints between the electrode tabs of the battery cells and the bus bars, and the reliability of the joints decreases. This may shorten the life of the assembled battery. In order to restrict the movement of the battery cells making up the battery cell group, the thickness of the first cover members and the second cover members that hold the battery cells may increase for higher strength. This, however, may degrade the cooling performance of the battery cells.

The present invention provides a battery module including a plurality of battery cells that prevents the movement of the battery cells due to impact and has excellent cooling performance for the battery cells.

Solution to Problem

A battery module according to one aspect of the present invention includes a battery cell group including a laminate of a plurality of flattened rectangular battery cells stacked in a thickness direction of the battery cells, and a housing storing the battery cell group. The battery cell group includes a plurality of cell holders configured to hold the individual battery cells from both sides in the thickness direction, and a plurality of side plates disposed at both ends of the plurality of battery cells in a width direction of the battery cells via the plurality of cell holders. Each of the cell holders has a restriction portion configured to restrict movement of the corresponding battery cell in a direction intersecting the thickness direction, and fixing portions that engage with the side plates.

Advantageous Effects of Invention

The battery module of the above-described aspect restricts the movement of the battery cells in the direction intersecting the thickness direction due to the restriction portions of the plurality of cell holders that hold the individual battery cells making up the battery cell group from both sides in the thickness direction, and allows the fixing portions of the cell holders to engage with the side plates. The battery module provided therefore prevents movement of the battery cells due to an impact, and also has excellent cooling performance for the battery cells because it does not require excessively high strength of the components to hold the battery cells.

DESCRIPTION OF EMBODIMENTS

The following describes one embodiment of a battery module according to the present invention, with reference to the drawings.

Figure 1:
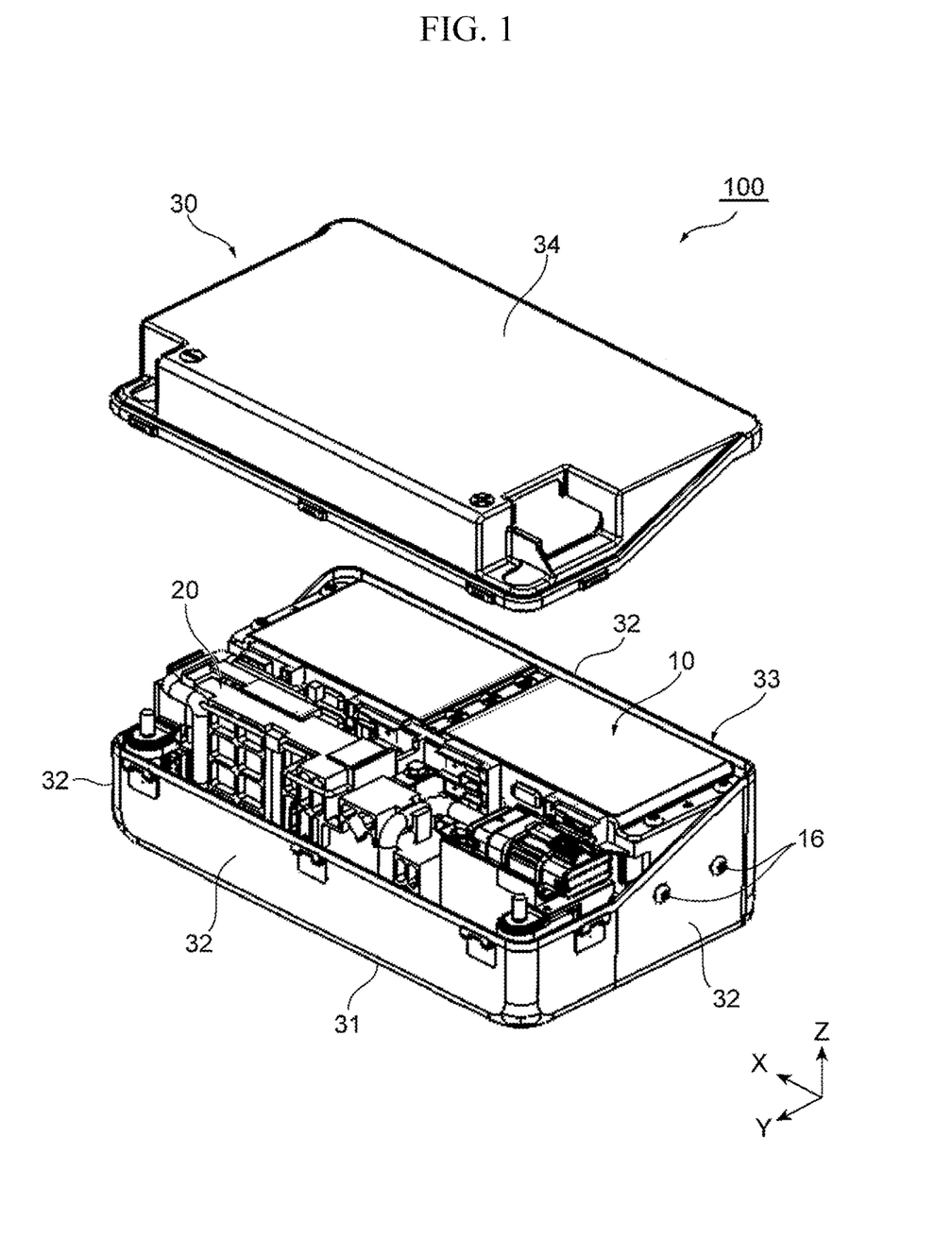
FIG. 1 is an exploded perspective view of a battery module according to one embodiment of the present invention.

FIG. 1 is an exploded perspective view of a battery module 100 according to one embodiment of the present invention. The battery module 100 of the present embodiment includes a battery cell group 10, and a housing 30 that stores this battery cell group 10 and its peripherals 20. In one example, the housing 30 is a substantially cuboid and rectangular box as a whole, and has a rectangular and planar bottom wall 31, a side wall 32 that rises vertically from the edge of the bottom wall 31, and a cover 34 to close an opening 33 at the upper end of the side wall 32.

Figure 2:
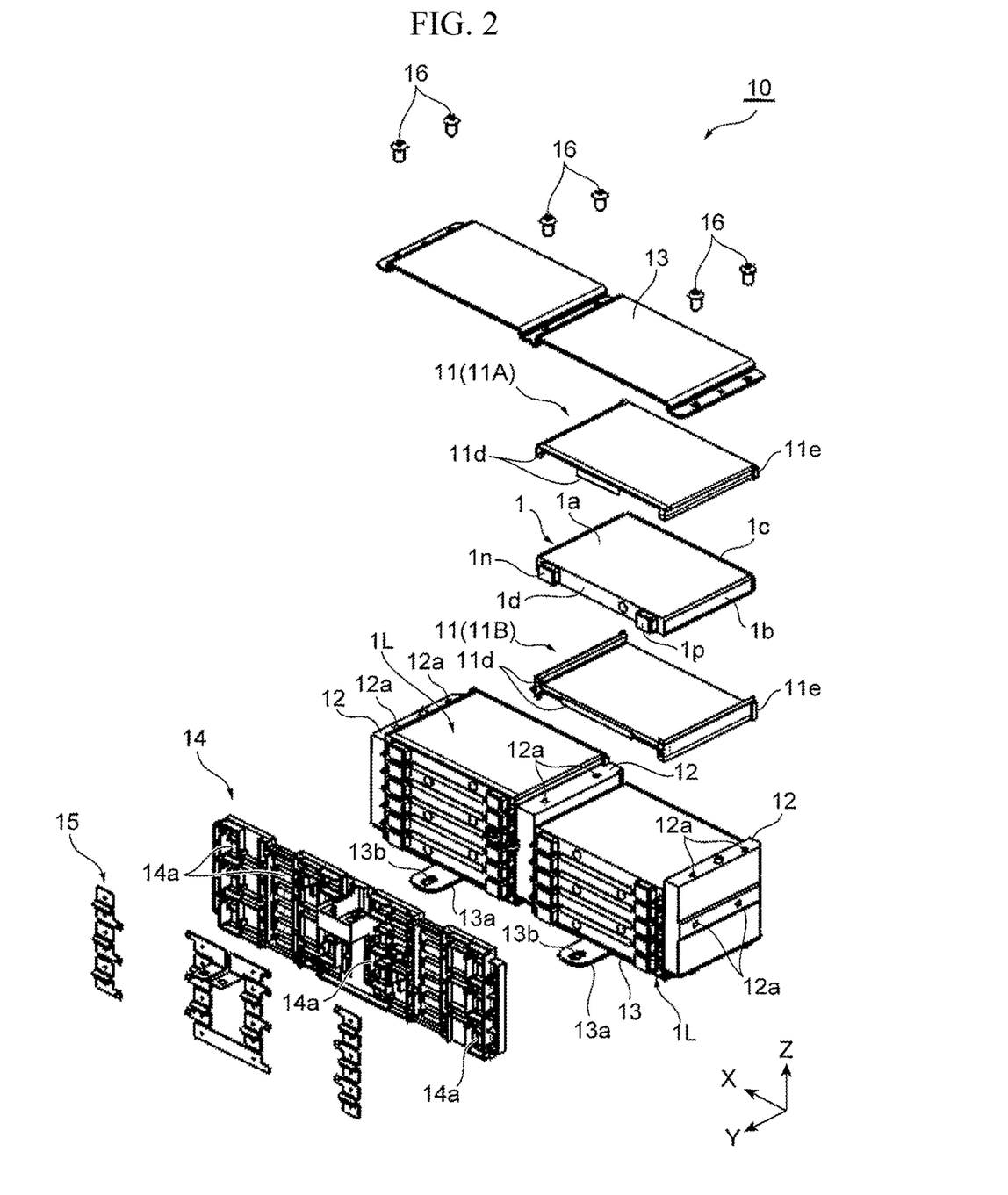
FIG. 2 is an exploded perspective view of the battery cell group stored in the housing of the battery module in FIG. 1.

FIG. 2 is an exploded perspective view of the battery cell group 10 stored in the housing 30 of the battery module 100 in FIG. 1. In one example, the battery cell group 10 is the laminate of a plurality of flattened rectangular battery cells 1 stacked in the thickness direction. In one example, the battery cell group 10 includes a plurality of battery cells 1, a plurality of cell holders 11, a plurality of side plates 12, a pair of end plates 13, a bus bar case 14, a plurality of bus bars 15, and a plurality of fasteners 16.

Figure 3:
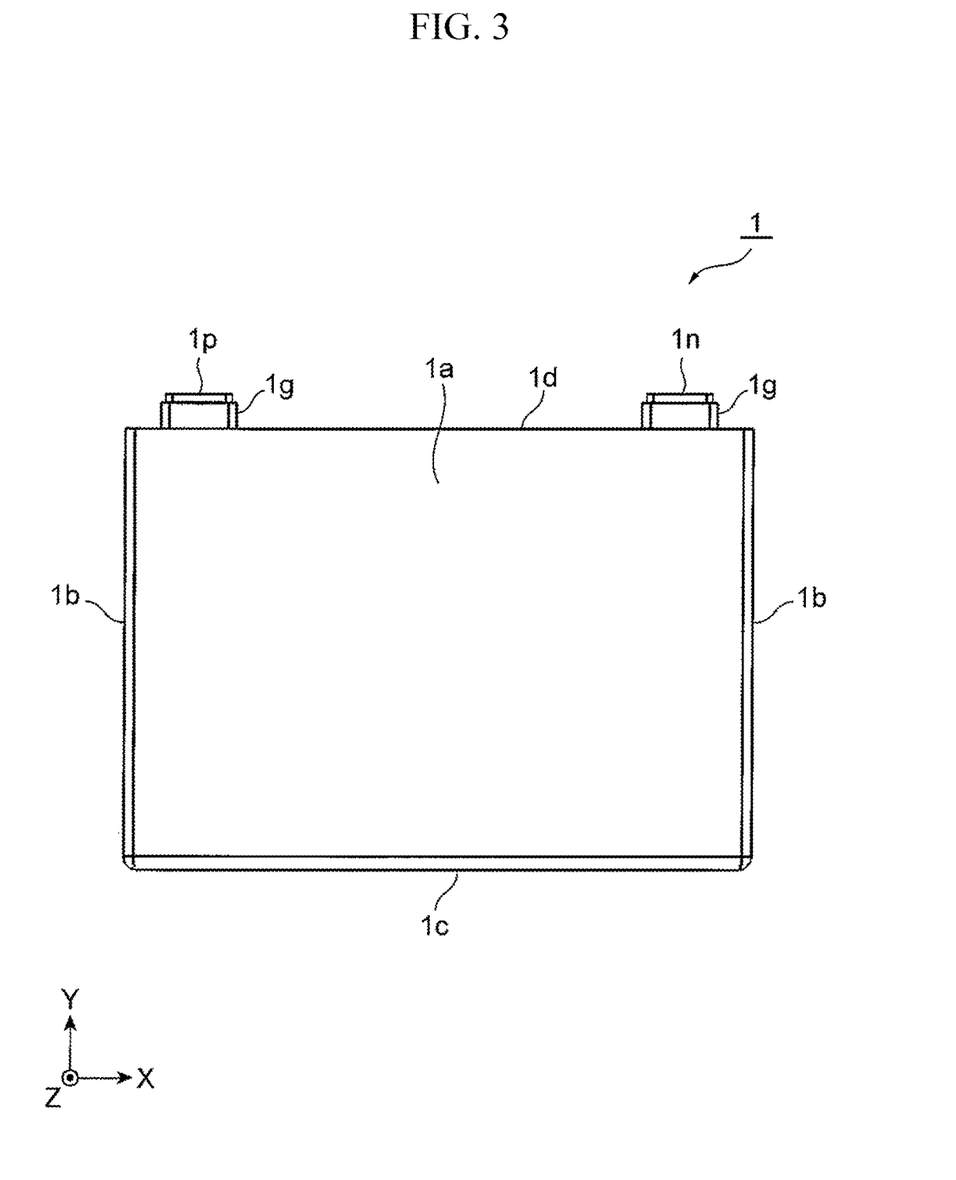
FIG. 3 is a front view of a battery cell of the battery cell group in FIG. 2.

FIG. 3 is a front view of one of the battery cells 1 in the battery cell group 10 of FIG. 2. In one example, the battery cell 1 is a lithium ion secondary battery having a flattened rectangular shape as a whole, that is, has a thin cuboid or hexahedron shape or rectangular box shape. Each battery cell 1 has a pair of wide side faces 1a facing the thickness direction of the battery cells 1, a pair of narrow side faces 1b facing the width direction of the battery cells 1, and a bottom face 1c and a top face 1d facing the height direction of the battery cells. The drawings show the orthogonal coordinate system in which the width direction of the battery cells 1 is X direction, the height direction of the battery cells 1 is Y direction, and the thickness direction of the battery cells 1 is Z direction.

In the example of FIG. 3, the battery cell 1 has a bottomed angular tube-shaped battery case having an opening at one end, and a rectangular and planar battery lid that closes the opening of the battery case. That is, the top face 1d of the battery cell 1 is the outer face of the battery lid, and the wide side faces 1a, the narrow side faces 1b, and the bottom face 1c of the battery cell 1 are the wide side faces 1a, the narrow side faces 1b, and the bottom face 1c of the battery case.

In one example, the battery cell 1, i.e., the battery case internally stores a winding electrode group prepared by winding a long strip-shaped positive electrode and negative electrode, which are opposed to each other with a long strip-shaped separator interposed between them, and electrolyte. The positive electrode and the negative electrode of the winding electrode group connect to a positive collector plate and a negative collector plate, respectively, which are fixed to the inside of the top face 1d of the battery cell 1, i.e., the inner face of the battery lid via an insulating member. The positive collector plate and the negative collector plate connect to a positive external terminal 1p and a negative external terminal 1n, respectively, that are disposed on the top face 1d of the battery cell 1, i.e., on the outer face of the battery 1d.

The positive external terminal 1p and the negative external terminal 1n pass through through-holes at both ends of the top face 1d of the battery cell 1, i.e., of the battery 1d to connect to the positive collector plate and the negative collector plate inside of the battery cell 1, respectively, to electrically connect to the positive electrode and the negative electrode of the winding electrode group via these positive collector plate and negative collector plate. An insulating member 1g, such as a gasket, interposes between the positive external terminal 1p or the negative external terminal 1n and the top face 1d, i.e., the outer face of the battery 1d for electrically insulation from the top face 1d of the battery cell 1.

As shown in FIGS. 1 and 2, the battery cell group 10 in the battery module 100 of the present embodiment is stored in the housing 30 so that the bottom faces 1c of the plurality of battery cells 1 are close to and opposed to the side wall 32 of the housing 30 and the height direction of the battery cells 1 is parallel to the bottom wall 31 of the housing 30. The arrangement of the plurality of battery cells 1 making up the battery cell group 10 of the battery module 100 is not limited to the example shown in FIGS. 1 and 2. In another example, the battery cell group 10 may be stored in the housing 30 so that the bottom faces 1c of the plurality of battery cells 1 are close to and opposed to the bottom wall 31 of the housing 30 and the height direction of the battery cells 1 is perpendicular to the bottom wall 31 of the housing 30.

In the description of the battery module 100 of the present embodiment, a first part being close to and opposed to a second part means that the first part and the second part are in contact with each other and the first part and the second part are opposed to each other with a minute gap of 1 mm or less or a few mm or less therebetween. That is, in the battery module 100 of the present embodiment, the bottom faces 1c of the plurality of battery cells 1 making up the battery cell group 10 and the side wall 32 or the bottom wall 31 of the housing 30 are in contact with each other or are opposed to each other while have a minute distance therebetween.

As shown in FIGS. 1 and 2, the battery cell group 10 stored in the housing 30 of the battery module 100 has the pair of end plates 13 disposed at both ends in the stacking direction of the battery cells 1 via the end cell holder 11A. In one example, the pair of end plates 13 includes metal plates made of a metal, such as aluminum or stainless steel. That is, the end plates 13 are made of metal.

The pair of end plates 13 is fastened for fixing to both ends of the side plates 12 in the stacking direction of the battery cells 1 by appropriate fasteners 16, such as bolts. The battery cells 1 making up the battery cell group 10 are held between the pair of end plates 13 while being pressed at the pair of wide side faces 1a of each battery cell 1 by the corresponding cell holder 11 from both sides in the thickness direction.

In the example shown in FIGS. 1 and 2, the battery cell group 10 stored in the housing 30 of the battery module 100 includes two battery rows 1L. In each of these two battery rows 1L, the plurality of battery cells 1 in the row is held by the cell holders 11 from both sides in the thickness direction and is stacked in the thickness direction of the battery cells 1. The number of the battery rows 1L in the battery cell group 10 is not limited to two, which may be one or three or more.

The battery cell group 10 stored in the housing 30 of the battery module 100 includes side plates 12 on both sides in the width direction of the battery cell 1 that are stacked in the thickness direction. More specifically, the battery cell group 10 in the example shown in FIGS. 1 and 2 includes a pair of side plates 12 sandwiching the two battery rows 1L from both sides in the width direction of the battery cells 1, and one side plate 12 interposed between these battery rows 1L, and so has three side plates 12 in total.

In one example, the pair of side plates 12, which sandwich the two battery rows 1L from both sides in the width direction of the battery cells 1, each have a fastening portion 12a, such as a threaded hole, for fastening with a bolt on the face opposed to the side wall 32 of the housing 30 of the battery module 100. The one side plate 12 interposed between the battery rows 1L has a not-shown fastening portion, such as a threaded hole, for fastening with a bolt on the face close to or opposed to the bottom wall 31 of the housing 30. In one example, the battery cell group 10 stored inside the housing 30 is fixed to the side wall 32 and the bottom wall 31 of the housing 30 by fastening the fasteners 16, such as bolts, passing through the through-holes in the side wall 32 and the bottom wall 31 of the housing 30 with the fastening portions 12a of the side plates 12. In this way, the battery cell group 10 is fixed to the inside of the housing 30.

The side plates 12 are disposed at both ends of the plurality of battery cells 1 in the width direction via the plurality of cell holders 11 that individually hold the plurality of battery cells 1 making up the battery cell group 10 from both sides in the thickness direction. In one example, the side plates 12 include metal plates made of a metal, such as aluminum or stainless steel. That is, the side plates 12 are made of metal. The side plates 12 each have a fastening portion 12a, such as a threaded hole, on both end faces in the stacking direction of the battery cells 1, and the end plates 13 are fastened to both ends of the side plates 12 in the stacking direction of the battery cells 1 with fasteners 16, such as bolts, fastened with these fastening portions 12a.

In the example shown in FIGS. 1 and 2, one of the end plates 13 that abuts and faces the bottom wall 31 of the housing 30 of the battery module 100 has a fixing tab 13a at one end of each battery row 1L in the height direction of the battery cells 1 and on the edge on the side opposite to the edge close to and opposed to the side wall 32 of the housing 30. The fixing tab 13a extends from a center part of each of the battery row 1L in the width direction of the battery cells 1 like a tab extending in the height direction of the battery cells 1. The fixing tab 13a has a through hole 13b to let a fastener 16, such as a bolt, pass through. In one example, the battery cell group 10 is fixed to the inside of the housing 30 by fastening the fixing tabs 13a of the end plate 13 to the bottom wall 31 of the housing 30 with fasteners 16, such as bolts.

The bus bar case 14 is a frame-like member, and is disposed to face the top faces 1d, on which the positive external terminals 1p and the negative external terminals 1n are placed, of the plurality of battery cells 1 making up the battery cell group 10. In one example, the bus bar case 14 is prepared by molding a resin material having an electrical insulating property, and has a plurality of openings 14a to hold a plurality of bus bars 15.

The plurality of bus bars 15 is held at the plurality of openings 14a of the bus bar case 14. In one example, the plurality of bus bars 15 joins to the positive external terminal 1p of one of mutually adjacent battery cells 1 and the negative external terminal 1n of the other battery cell 1 by laser welding, so as to connect the plurality of battery cells 1 making up the battery cell group 10 in series.

Figure 4:
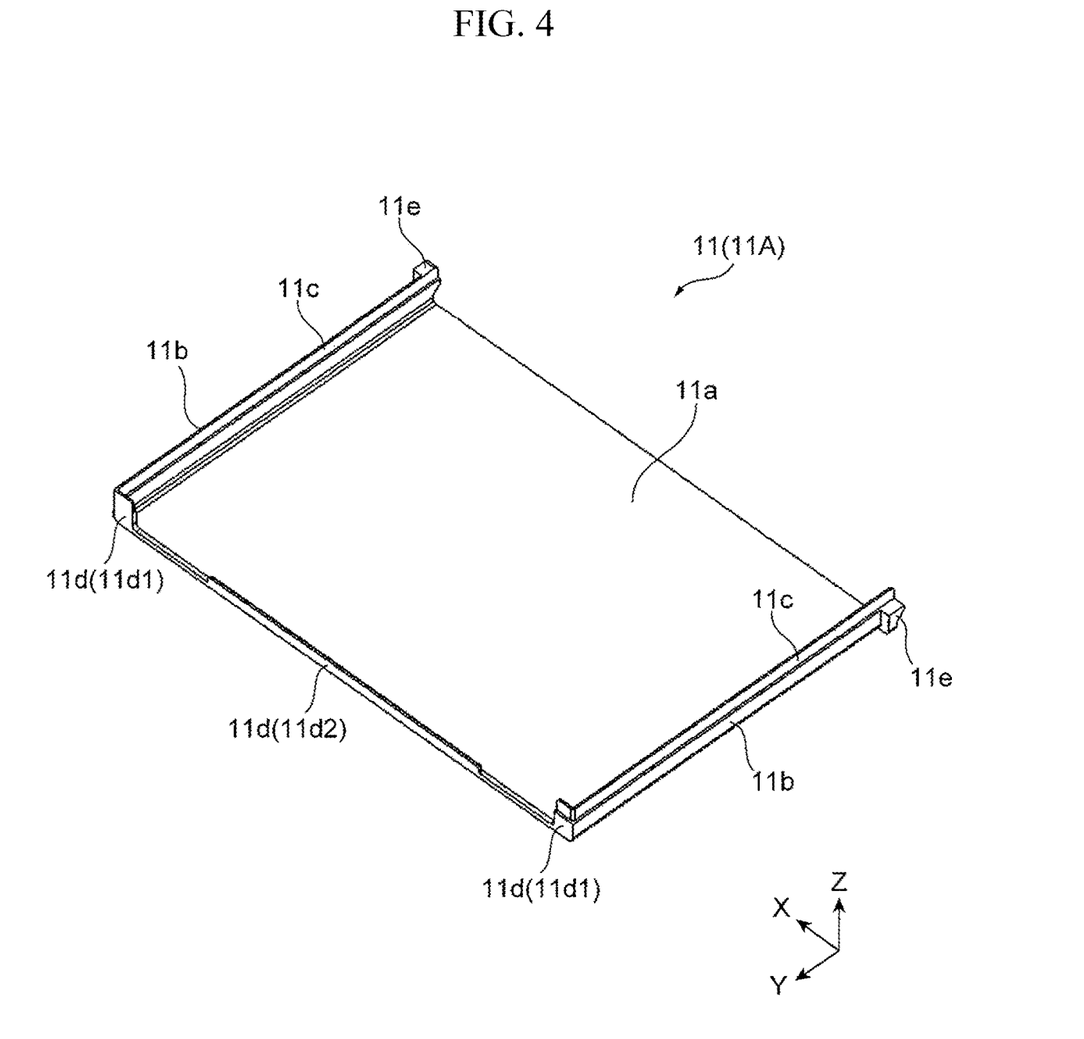
FIG. 4 is a perspective view of a cell holder to hold the battery cell of the battery cell group in FIG. 2.
Figure 5:
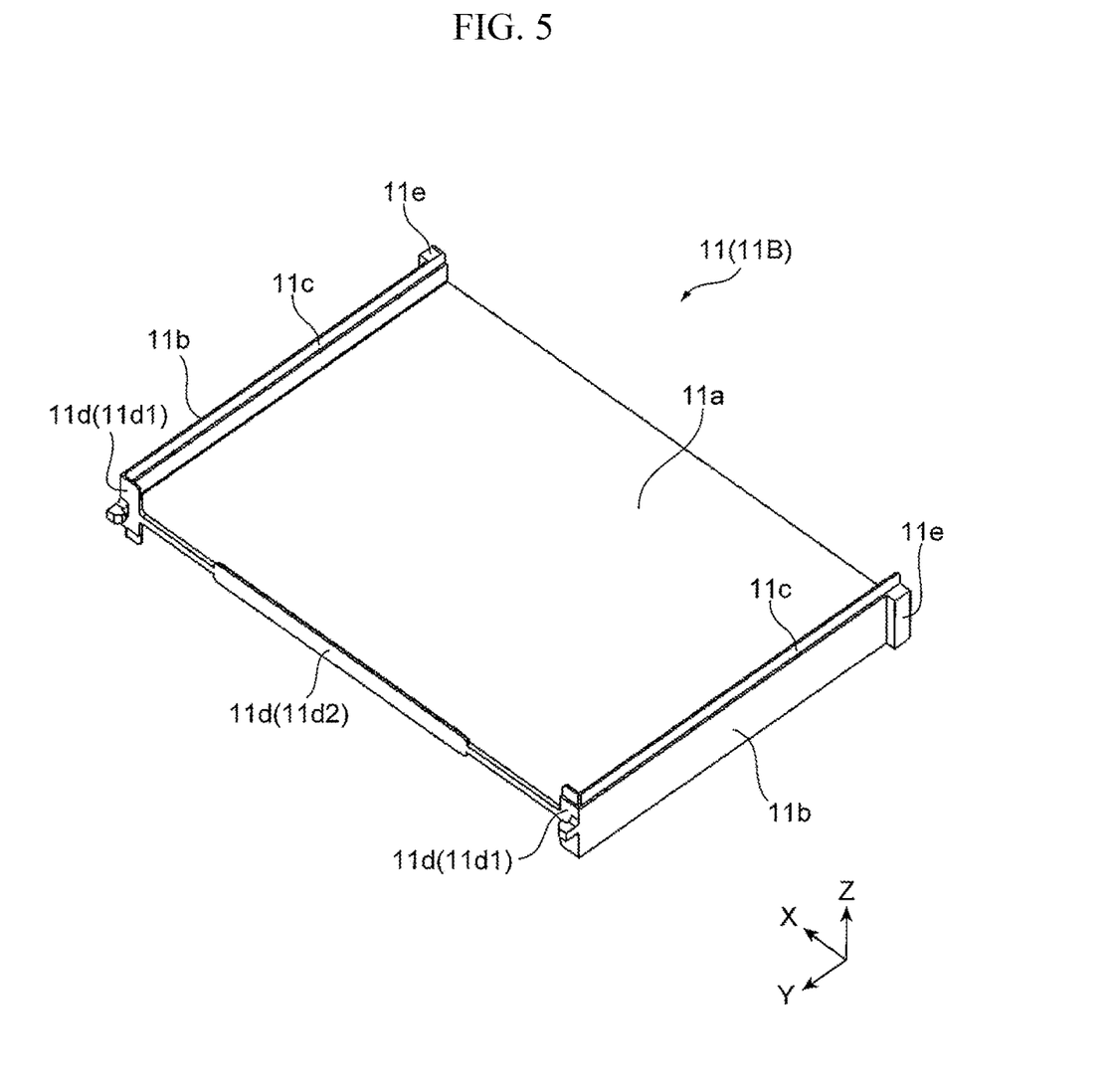
FIG. 5 is a perspective view of a modified example 1 of the cell holder in FIG. 4.

FIGS. 4 and 5 are perspective views of the cell holder 11 making up the battery cell group 10 of FIG. 2. The end cell holder 11A shown in FIG. 4 is disposed between each of the battery cells 1 at both ends in the stacking direction of the plurality of battery cells 1 stacked in the thickness direction and the corresponding end plate 13. The intermediate cell holder 11B shown in FIG. 5 is disposed between two adjacent cells 1 in the stacking direction of the plurality of battery cells 1 stacked in the thickness direction. The plurality of cell holders 11 including the end cell holders 11A and the intermediate cell holders 11B holds the individual cells 1 from their both sides in the thickness direction.

More specifically, when the plurality of battery cells 1 is stacked in the thickness direction, each of the two battery cells 1 at both ends in the stacking direction of the battery cells 1 is held by the end cell holder 11A and the intermediate cell holder 11B from both sides in the thickness direction. When the plurality of battery cells 1 is stacked in the thickness direction, each of the plurality of intermediate battery cells 1 other than the two battery cells 1 at both ends in the stacking direction of the battery cells 1 is held by the two intermediate cell holders 11B from both sides in the thickness direction.

In one example, the cell holder 11 has a planar portion 11a that is close to and opposed to the wide side face 1a of the battery cell 1, and a side wall portion 11b that is close to and opposed to the narrow side face 1b of the battery cell 1. The planar portion 11a of the end cell holder 11A is disposed between the end plate 13 and the battery cell 1 so that one of the faces is close to and opposed to the wide side face 1a of the battery cell 1, and the other face is close to and opposed to the end plate 13. The planar portion 11a of the intermediate cell holder 11B is disposed between the mutually adjacent two battery cells 1 so that one face and the other face are close to and opposed to the wide side face 1a of one of these battery cells 1 and the wide side face 1a of the other battery cell 1, respectively.

The side wall portions 11b of the cell holder 11 extend in the thickness direction (Z direction) of the battery cell 1 from both edges of the planar portion 11a in the width direction (X direction) of the battery cell 1 held by the cell holder 11. The side wall portions 11b are close to and opposed to the narrow side faces 1b of the battery cell 1. Each of the side wall portions 11b has a step 11c at the distal end in the thickness direction of the battery cell 1 held by the cell holder 11. The steps 11c of the side wall portions 11b facing each other of the two cell holders 11 that hold the battery cells 1 from both sides in the thickness direction are located alternately inside and outside in the width direction of the battery cell 1 and overlap each other for engagement.

The cell holder 11 has a restriction portion 11d that restricts movement of the battery cell 1 in a direction intersecting the thickness direction (Z direction), and fixing portions 11e that engage with the side plates 12. In the example shown in FIGS. 4 and 5, the restriction portion 11d of the cell holder 11 is disposed along one edge of the planar portion 11a in the height direction (Y direction) of the battery cell 1 held by the cell holder 11. The restriction portion 11d extends in the thickness direction and the width direction (X direction) of the battery cell 1 to abut and be close to and opposed to the top face 1d of the battery cell 1.

In one example, the restriction portion 11d is disposed at both ends in the width direction of the battery cell 1 and at a center part in the width direction of the battery cell 1 with a space between the restriction portions at both ends and the center part. In one example, the end restriction portions 11d1 at both ends in the width direction of the battery cell 1 each extend from one end of the side wall portion 11b in the height direction of the battery cell 1 inwardly in the width direction of the battery cell 1 to hold the corner of the battery cell 1 together with the side wall portion 11b and so restrict the movement of the cell 1 in the direction intersecting the thickness direction of the battery cell 1. The end restriction portions 11d1 each have the same dimensions as the side wall portion 11b in the thickness direction of the battery cell 1, and have a step 11c like the side wall portion 11b.

The intermediate restriction portion 11d2 at the center part in the width direction of the battery cell 1 has a dimension in the thickness direction of the battery cell 1 smaller than that of the side wall portion 11b in this direction. This intermediate restriction portion 11d2 protrudes from the planar portion 11a of the cell holder 11 in the thickness direction of the battery cell 1, and is close to and opposed to the portion of the top face 1d of the battery cell 1 between the positive external terminal 1p and the negative external terminal 1n. The protruding height of this intermediate restriction portion 11d2 in the thickness direction of the battery cell 1 is ½ or less of the thickness of the battery cell 1.

Each of the fixing portions 11e of the cell holder 11 projects from the corresponding side wall portion 11b of the cell holder 11 in the direction opposite to the narrow side face 1b of the battery cell 1 held by the cell holder 11. That is, each fixing portion 11e of the cell holder 11 projects from the outer side face of the corresponding side wall portion 11b of the cell holder 11 in the width direction (X direction) of the battery cell 1 outwardly in the width direction of the battery cell 1. In the example of FIGS. 4 and 5, these fixing portions 11e of the cell holder 11 are disposed at the ends close to the bottom face 1c of the battery cell 1 in the height direction (Y direction) of the battery cell 1 held by the cell holder 11 and extend in the thickness direction (Z direction) of the battery cell 1 at a part other than the step 11c on the other side.

In the battery module 100 of the present embodiment, the planar portion 11a, the side wall portions 11b, the restriction portion 11d and the fixing portions 11e of the cell holder 11 are monolithic. More specifically, the planar portion 11a, the side wall portions 11b, the restriction portion 11d and the fixing portions 11e of the cell holder 11 are monolithically formed by integral molding of one resin material by injection molding, for example. The planar portion 11a, the side wall portions 11b, the restriction portion 11d and the fixing portions 11e of the cell holder 11 being monolithic means that these parts of the cell holder 11 are not manufactured as separate members and then assembled. Rather this means that the cell holder 11 as a whole is manufactured as a single component.

Figure 6A:
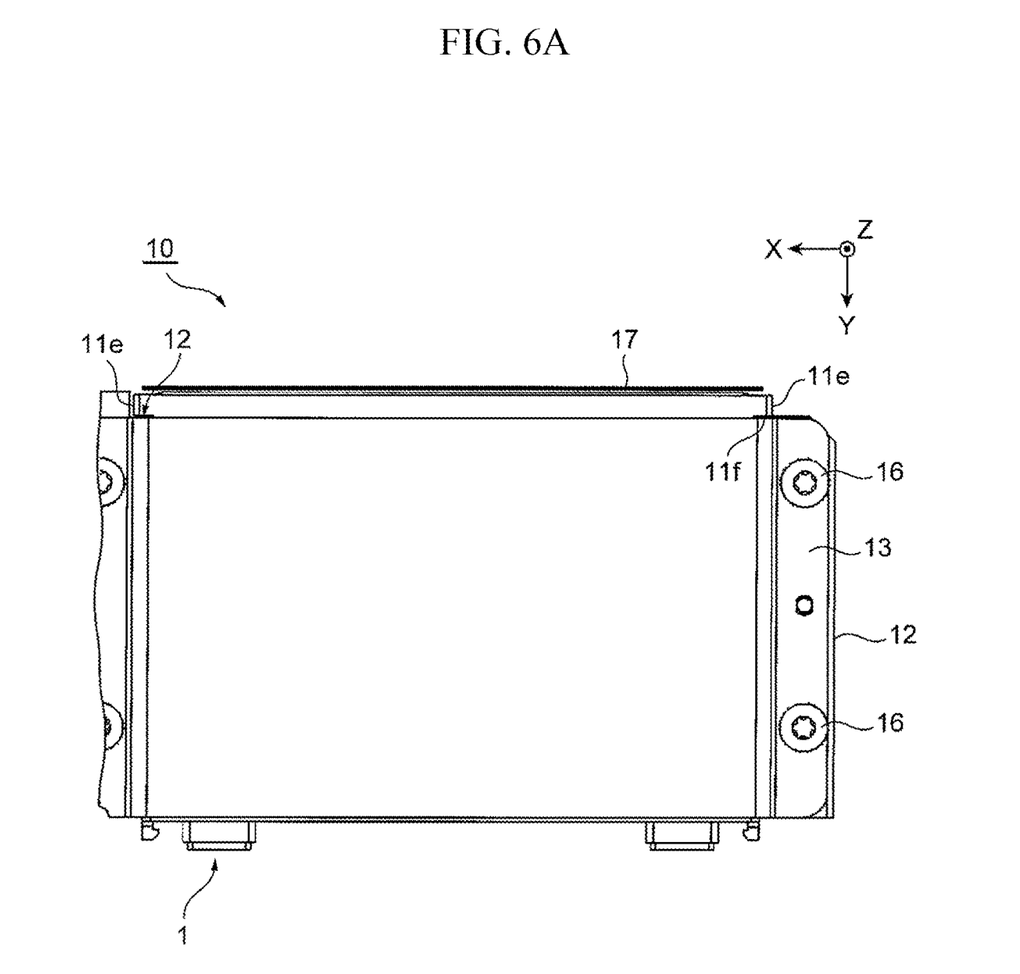
FIG. 6A is an enlarged plan view of the battery cell group stored in the housing of the battery module in FIG. 1.
Figure 6B:
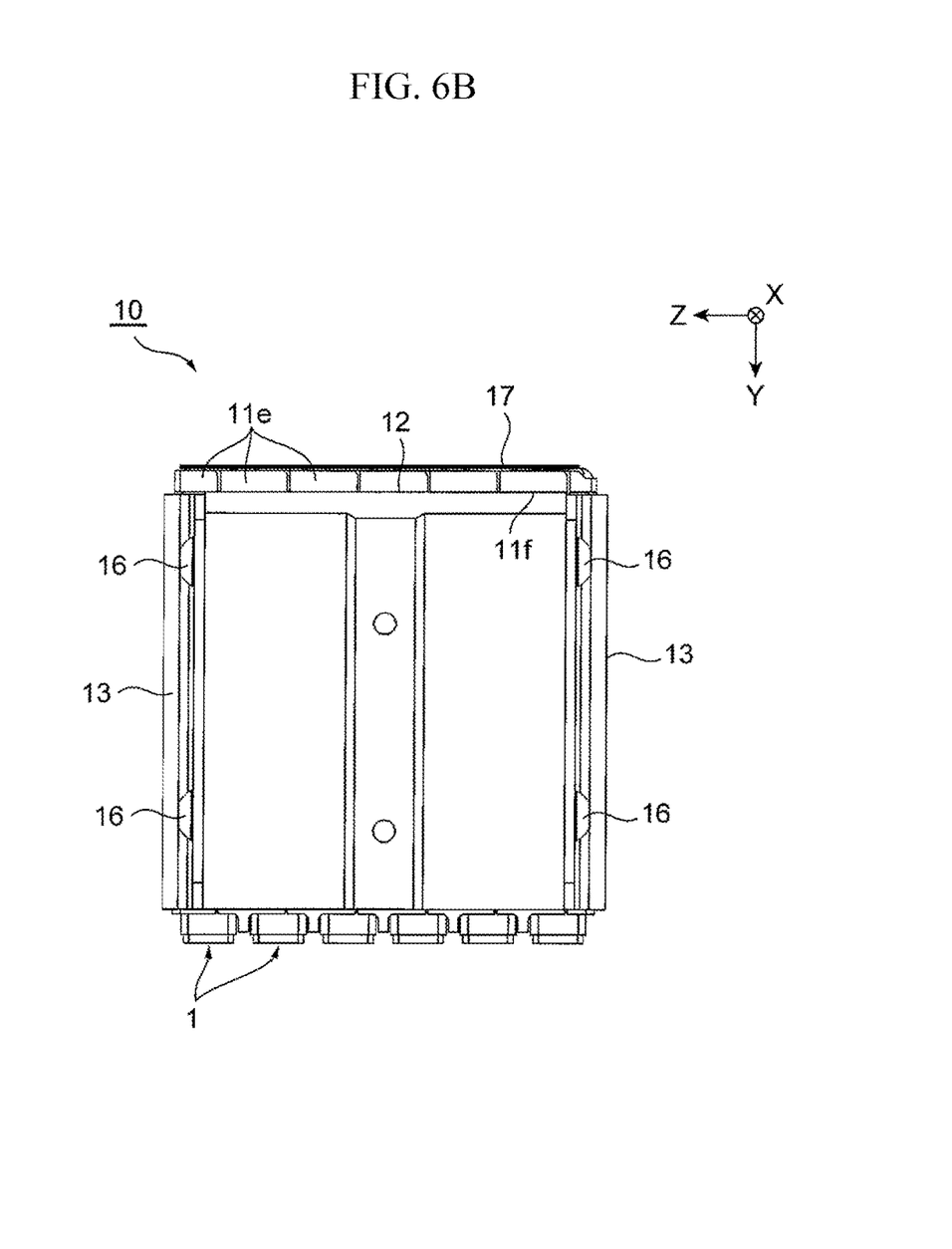
FIG. 6B is an enlarged side view of the battery cell group stored in the housing of the battery module in FIG. 1.

FIGS. 6A and 6B are an enlarged plan view and an enlarged side view, respectively, of the battery cell group 10 stored in the housing 30 of the battery module 100 in FIG. 1. In one example, the fixing portions 11e of the cell holder 11 are fixed to the side plates 12 of the battery cell group 10. As mentioned above, the battery cell group 10 in the battery module 100 of the present embodiment is fixed to the inside of the housing 30 via the fixing tabs 13a of the end plate 13 and the fastening portions 12a of the side plates 12, for example.

In the example of FIGS. 6A and 6B, the fixing portions 11e of the cell holder 11 each have one of the faces in the height direction (Y direction) of the battery cell 1 held by the cell holder 11, and this face engages with one end of the corresponding side plate 12. More specifically, the end face of each side plate 12 facing the side wall 32 of the housing 30 of the battery module 100 is close to and opposed to the end face of the corresponding fixing portion 11e of the cell holder 11 in the height direction of the battery cell 1.

The fixing portions 11e of the cell holder 11 each have the end face on the side opposite to the end face facing the end face of the side plate 12 in the height direction (Y direction) of the battery cell 1 held by the cell holder 11, and this end face may be close to and opposed to the side wall 32 of the housing 30. In one example, each fixing portion 11e of the cell holder 11 has an engagement face 11f facing the side plate 12, and this engagement face 11f is parallel to the bottom face 1c of the battery cell 1 held by the cell holder 11 and the side wall 32 of the housing 30 opposed to this bottom face 1c of the battery cell 1.

In the example of FIGS. 6A and 6B, the fixing portions 11e of the cell holder 11 and the side wall 32 of the housing 30 are close to and opposed to each other via a sheet member 17. In one example, the sheet member 17 is a heatsink sheet or a heat-transfer sheet that transfers heat of the battery cells 1 making up the battery cell group 10 to the housing 30. In one example, the sheet member 17 interposes between the bottom faces 1c of the plurality of battery cells 1 making up the battery cell group 10 or the ends of the cell holders 11 and the side wall 32 of the housing 30. In the configuration where the bottom faces 1c of the plurality of battery cells 1 making up the battery cell group 10 are close to and opposed to the bottom wall 31 of the housing 30, the sheet member 17 may interpose between the bottom faces 1c of the plurality of battery cells 1 making up the battery cell group 10 or the ends of the cell holders 11 and the bottom wall 31 of the housing 30, for example.

The following describes advantageous effects of the battery module 100 of the present embodiment.

As stated above, the battery module 100 of the present embodiment includes the battery cell group 10 that is the laminate of a plurality of flattened rectangular battery cells 1 stacked in the thickness direction, and the housing 30 storing this battery cell group 10. The battery cell group 10 includes the plurality of cell holder 11 to hold the individual battery cells 1 from both sides in the thickness direction, and the plurality of side plates 12 disposed at both ends of the plurality of battery cells 1 in the width direction via the plurality of cell holders 11. Each of the cell holders 11 has the restriction portion 11d that restricts movement of the battery cell 1 in the direction intersecting the thickness direction and the fixing portions 11e that engage with the side plates 12.

With this configuration, the battery module 100 of the present embodiment restricts the movement of the battery cells in the direction intersecting the thickness direction due to the restriction portions 11d of the plurality of cell holders 11 that hold the individual cells 1 making up the battery cell group 10 from both sides in the thickness direction. Further, each of the fixing portions 11e of the cell holders 11 engages with the corresponding side plate 12, and this restricts the movement of the cell holders 11 in the direction intersecting the thickness direction of the battery cells 1. Accordingly, the cell holders 11 whose movement is restricted by the side plates 12 prevents the movement of the battery cells 1 due to an impact applied to the battery module 100.

This configuration therefore reduces a load applied to a joint between the plurality of bus bars 15 and the positive external terminals 1p and the negative external terminals 1n of the plurality of battery cells 1 in the battery cell group 10 or to a connecting part between a connecting terminal of the external wiring for connecting the battery module 100 to an external device and the bus bar 15. This configuration does not require excessively high strength of the components of the battery cell group 10 to hold the battery cells 1, and so prevents deterioration of the heat radiation property of the battery cells 1. This configuration therefore provides the battery module 100 having excellent cooling performance for the battery cells 1.

In this battery module 100 of the present embodiment, each of the battery cells 1 making up the battery cell group 10 has the pair of wide side faces 1a facing the thickness direction of the battery cell 1, the pair of narrow side faces 1b facing the width direction of the battery cell 1, and the bottom face 1c and the top face 1d facing the height direction of the battery cell 1. As described above, the battery cell group 10 is stored in the housing 30 so that the bottom faces 1c of the plurality of battery cells 1 abut or are close to and opposed to the side wall 32 or the bottom wall 31 of the housing 30. The restriction portion 11d of each cell holder 11 extends in the thickness direction and in the width direction of the battery cell 1 to abut and be opposed to the top face 1d of the corresponding battery cell 1.

With this configuration, the side wall 32 or the bottom wall 31 of the housing 30 abuts or is close to and opposed to the bottom faces 1c of the battery cells 1, and so restricts the movement of the battery cells 1 in the direction from the top face 1d to the bottom face 1c in the height direction of the battery cells 1 that intersects the thickness direction of the battery cells 1. The restriction portion 11d of each cell holder 11 extends in the thickness direction and in the width direction of the battery cell 1 to abut and be opposed to the top face 1d of the battery cell 1, and such a restriction portion 11d restricts the movement of the battery cell 1 in the direction from the bottom face 1c to the top face 1d in the height direction of the battery cell 1. In this way, the housing 30 and the restriction portions 11d restrict the movement of the battery cells 1 in the height direction more reliably.

As described above, the battery module 100 of the present embodiment includes the sheet member 17 interposed between the bottom faces 1c of the plurality of battery cells 1 and the side wall 32 or the bottom wall 31 of the housing 30. With this configuration, the sheet member 17 alleviates an impact applied between the bottom faces 1c of the battery cells 1 and the side wall 32 or the bottom wall 31 of the housing 30 that are mutually opposed. When the sheet member 17 is a heatsink sheet or a heat-transfer sheet, such a sheet member 17 promotes heat radiation from the bottom faces 1c of the battery cells 1 to the housing 30, and so improves the cooling performance of the battery cells 1.

The battery module 100 of the present embodiment is configured so that the cell holders 11 of the battery cell group 10 each have the side wall portions 11b that are close to and opposed to the narrow side faces 1b of the corresponding cell 1. Each of the fixing portions 11e of the cell holder 11 projects from the corresponding side wall portion 11b in the direction opposite to the narrow side face 1b. This allows the fixing portion 11e to engage with a high-strength structure making up the battery cell group 10, such as the side plate 12, and so this configuration restricts the movement of the cell holder 11 more reliably. The side wall portions 11b of the cell holders 11 and the side plates 12 restrict the movement of the battery cells 1 in the width direction. The cell holders 11 therefore restrict the movement of the battery cells 1 more reliably.

The battery module 100 of the present embodiment is configured so that the battery cell group 10 is fixed to the inside of the housing 30. The fixing portions 11e of the cell holders 11 are fixed to the side plates 12 of the battery cell group 10. This allows the battery cell group 10 to be fixed to the inside of the housing 30 firmly, and prevents the movement of the side plates 12 more reliably when an impact acts on the battery cell group 100. The battery module of the present embodiment therefore restricts the movement of the cell holders 11 more reliably via the fixing portions 11e of the cell holders 11 fixed to the side plates 12, and the cell holders 11 restrict the movement of the battery cells 1 in the direction intersecting the thickness direction of the battery cells 1 more reliably.

The battery module 100 of the present embodiment is configured so that each of the cell holders 11 of the battery cell group 10 has the planar portion 11a opposed to the wide side face 1a of the battery cell 1, and this planar portion 11a, the side wall portions 11b, the restriction portion 11d and the fixing portions 11e are monolithic. This makes the cell holder 11 thinner, and so improves the heat radiation property of the battery cells 1. This also reduces the manufacturing cost of the cell holders 11, and also improves the efficiency to assemble the battery cell group 10 and so improves the productivity of the battery module 100.

The battery module 100 of the present embodiment is configured so that the side plates 12 of the battery cell group 10 are made of metal. This keeps the strength of the side plates 12 to prevent the movement of the battery cells 1 due to an impact more reliably, and also improves the thermal conductivity of the side plates 12 and so improves the cooling performance of the battery cells 1.

As described above, the present embodiment provides the battery module 100 including a plurality of battery cells 1 that prevents the movement of the battery cells 1 due to an impact and has excellent cooling performance for the battery cells 1. That is a detailed description of the embodiment of the present invention with reference to the drawings. The specific configuration of the present invention is not limited to the above-stated embodiment, and the design may be modified variously without departing from the spirits of the present invention. The present invention also covers such modified embodiments.

Referring to FIGS. 7 to 10 together with FIGS. 1 to 3, the following describes some modified examples of the battery module 100 according to the above-described embodiment.

Figure 7:
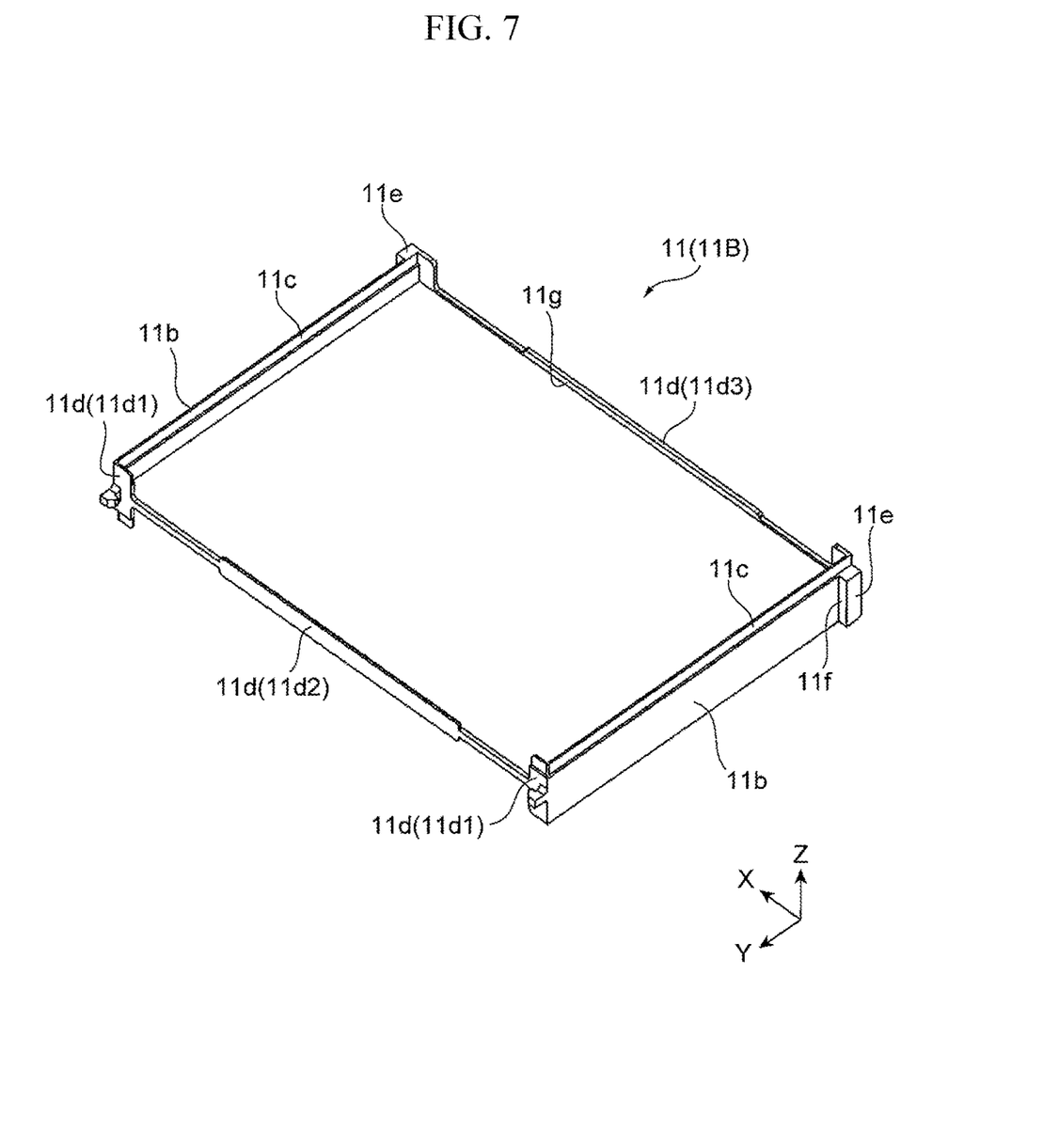
FIG. 7 is a perspective view of a modified example of the cell holder to hold a battery cell of the battery cell group in FIG. 2.

FIG. 7 is a perspective view of a modified example of the cell holder 11 to hold a battery cell 1 making up the battery cell group 10 of FIG. 2. This modified example is configured so that each cell holder 11 has a bottom-face opposing portion 11d3 as the restriction portion 11d that extends in the thickness direction and in the width direction of the battery cell 1 to abut and be opposed to the bottom face 1c of the battery cell 1. With this configuration, the bottom-face opposing portion 11d3 as the restriction portion 11d of the cell holder 11 to abut and be opposed to the bottom face 1c of the battery cell 1 restricts the movement of the battery cell 1 in the direction from the top face 1d to the bottom face 1c in the height direction of the battery cell 1 that intersects the thickness direction of the battery cell 1. This restricts the movement of the battery cell 1 in the height direction more reliably with the restriction portion 11d to abut and be opposed to the top face 1d and the bottom face 1c of the battery cell 1.

In the example of FIG. 7, the cell holder 11 has a fixing portion 11e to be opposed to the side plate 12 and the fixing portion 11e has an engagement face 11f. The bottom-face opposing portion 11d3 as the restriction portion 11d to be opposed to the bottom face 1c of the battery cell 1 has a restriction face 11g. These engagement face 11f and restriction face 11g are parallel to each other. With this configuration, when a force from the bottom face 1c of the battery cell 1 acts on the restriction face 11g of the bottom-face opposing portion 11d3 as the restriction portion 11d of the cell holder 11, the side plate 12 supports the engagement face 11f of the fixing portion 11e so as to prevent the tilting of the restriction face 11g. The end cell holder 11A shown in FIG. 4 also is able to have the configuration similar to that shown in the modified example of FIG. 7.

Figure 8:
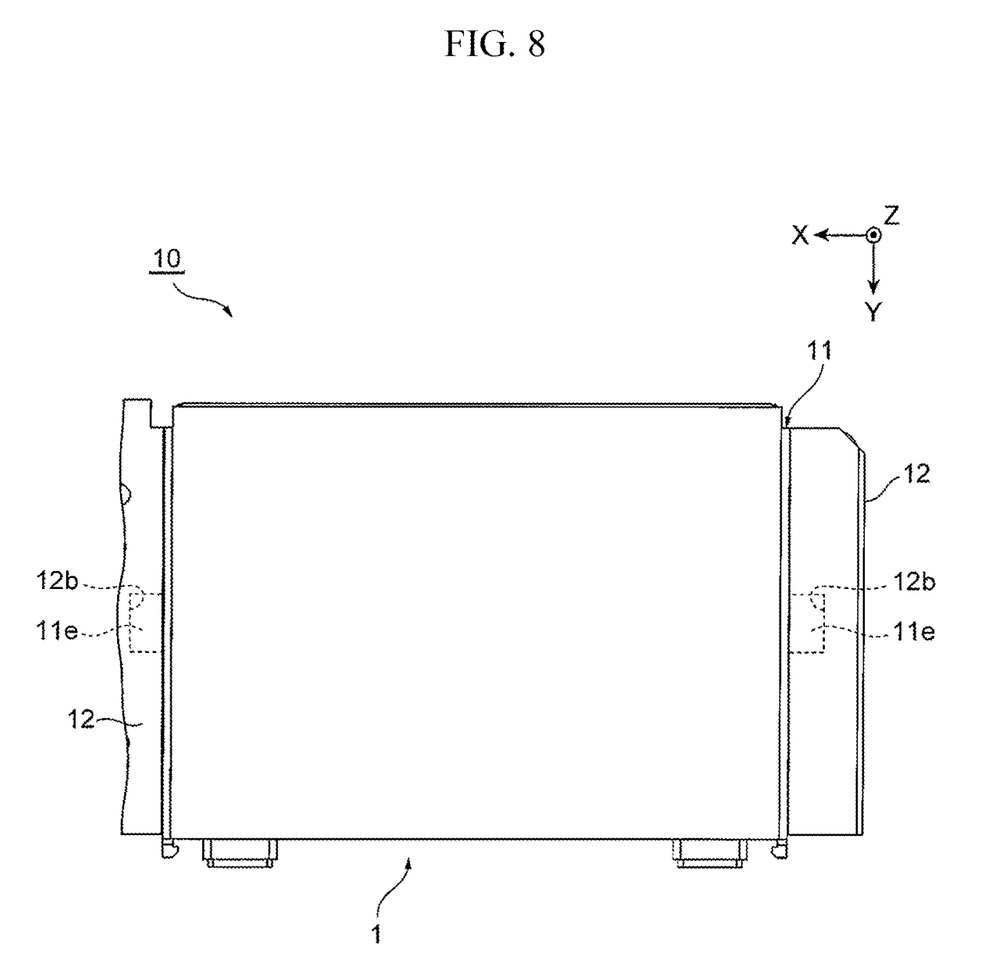
FIG. 8 is an enlarged plan view of a modified example of the battery cell group in FIGS. 6A and 6B.

FIG. 8 is an enlarged plan view of a modified example of the battery cell group 10 in FIGS. 6A and 6B. This modified example is configured so that each of the side wall portions 11b of the cell holder 11 has a fixing portion 11e at a center part in the height direction of the battery cell 1, and the fixing portion 11e protrudes outwardly in the width direction of the battery cell 1 from the outer face of the side wall portion 11b in the width direction of the battery cell 1. Each of the side plates 12 has a recess 12b for engagement with the inserted corresponding fixing portion 11e. This configuration restricts the movement of the cell holder 11 in the direction intersecting the thickness direction of the battery cell 1 more reliably, and so restricts the movement of the battery cell 1 held by the cell holder 11 in the direction intersecting the thickness direction of the battery cell 1 more reliably.

Figure 9:
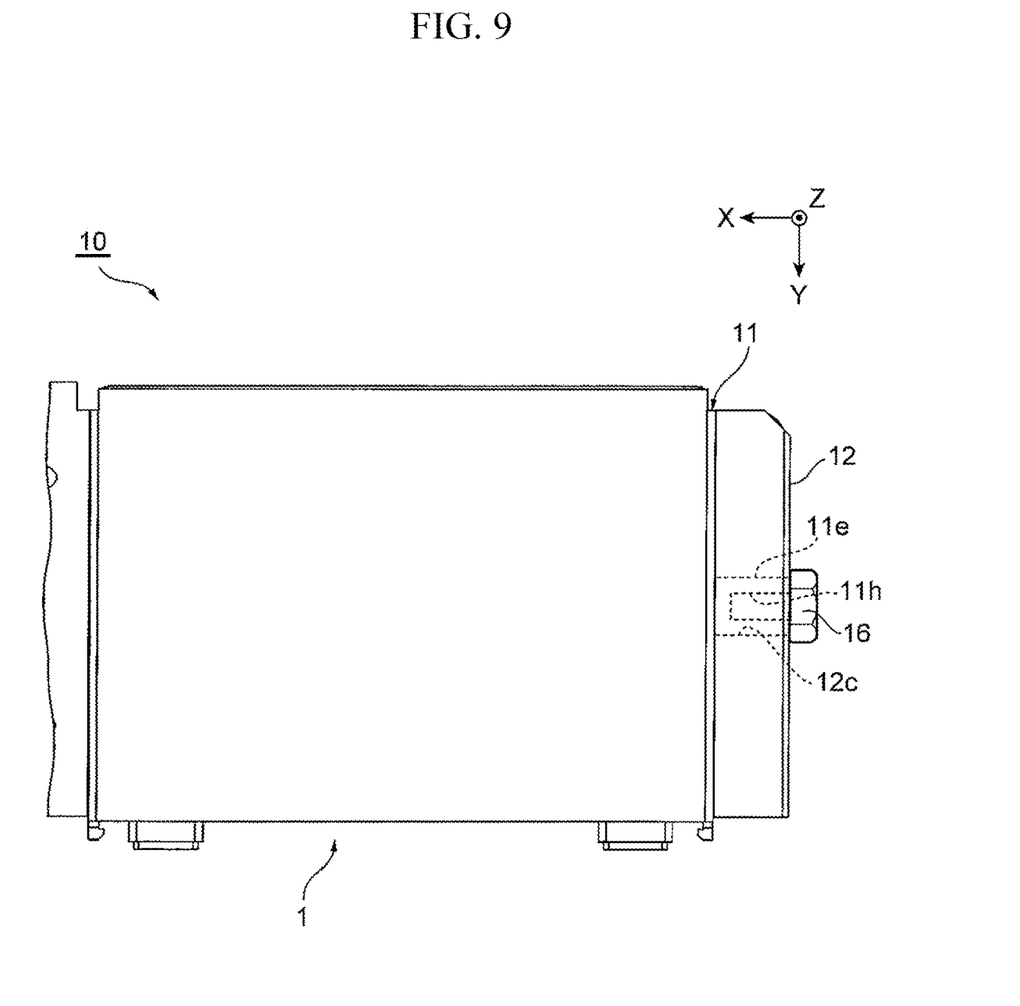
FIG. 9 is an enlarged plan view of a modified example of the battery cell group in FIGS. 6A and 6B.

FIG. 9 is an enlarged plan view of another modified example of the battery cell group 10 shown in FIGS. 6A and 6B. Similarly to the modified example of FIG. 8, this modified example of FIG. 9 is configured so that each of the side wall portions 11b of the cell holder 11 has a fixing portion 11e at a center part in the height direction of the battery cell 1, and the fixing portion 11e protrudes outwardly in the width direction of the battery cell 1 from the outer face of the side wall portion 11b in the width direction of the battery cell 1. Each of the side plates 12 has a recess or a through hole 12c for engagement with the inserted corresponding fixing portion 11e.

In the example shown in FIG. 9, the fixing portion 11e has a fastening portion 11h, such as a threaded hole, for fastening with a fastener 16, such as a bolt, and the battery cell group 10 includes a fastener 16, such as a bolt, to fasten the fixing portion 11e of the cell holder 11 to the side plate 12 for fixing. This configuration fixes the fixing portion 11e of the cell holder 11 to the corresponding side plate 12 more firmly, and restricts the movement of the cell holder 11 in the direction intersecting the thickness direction of the battery cell 1 more reliably, and so restricts the movement of the battery cell 1 held by the cell holder 11 in the direction intersecting the thickness direction of the battery cell 1 more reliably.

Figure 10:
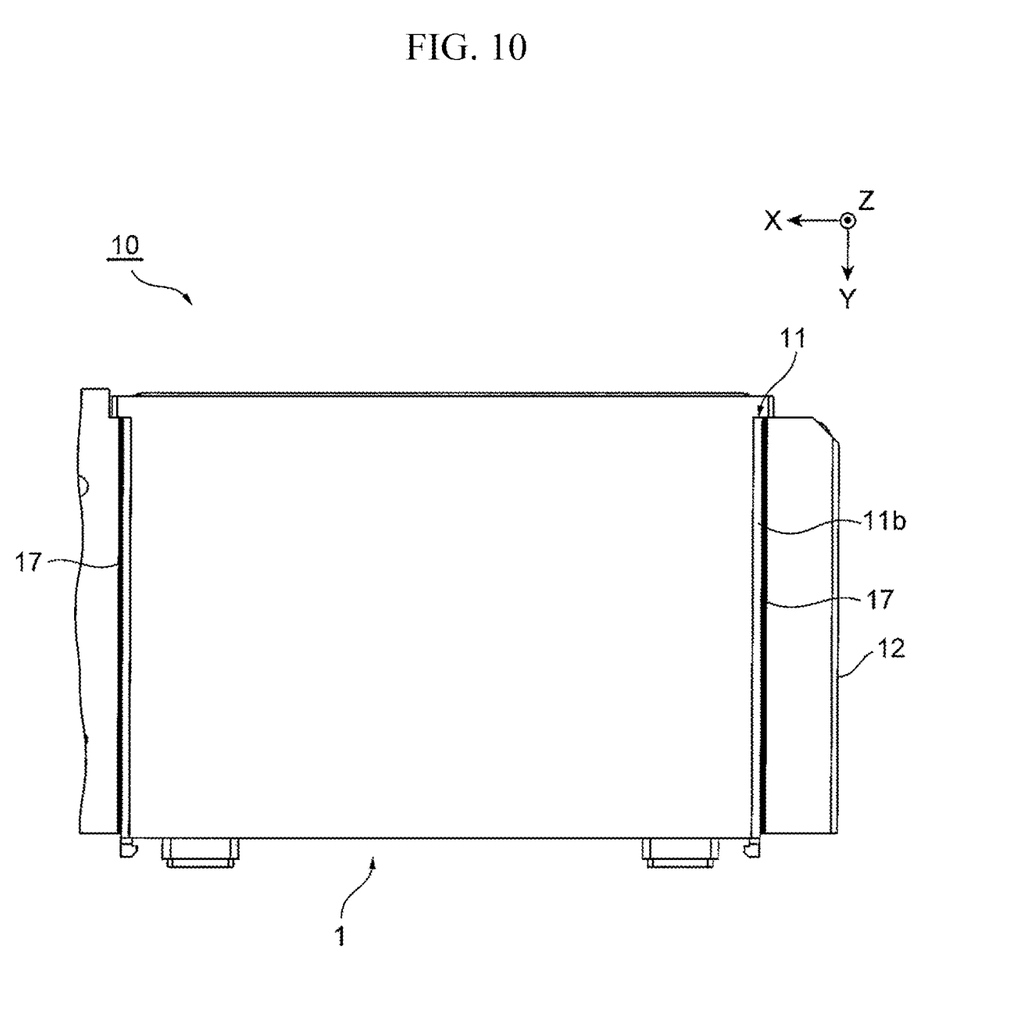
FIG. 10 is an enlarged plan view of a modified example of the battery cell group in FIGS. 6A and 6B.

FIG. 10 is an enlarged plan view of another modified example of the battery cell group 10 shown in FIGS. 6A and 6B. In the example of FIG. 10, the battery module 100 includes a sheet member 17 interposed between the cell holder 11 and each of the side plates 12. In one example, the sheet member 17 has a configuration similar to that of the sheet member 17 shown in FIGS. 6A and 6B. With this configuration, the sheet member 17 alleviates an impact applied between the side wall portion 11b of the cell holder 11 and the side plate 12 that are mutually opposed. When the sheet member 17 is a heatsink sheet or a heat-transfer sheet, such a sheet member 17 promotes heat radiation from the narrow side face 1b of the battery cell 1 to the side plate 12 via the side wall portion 11b of the cell holder 11 and the sheet member 17, and so improves the cooling performance of the battery cell 1.

REFERENCE SIGNS LIST

1 Battery cell
1a Wide side face
1b Narrow side face
1c Bottom face
1d Top face
10 Battery cell group
11 Cell holder
11a Planar portion
11b Side wall portion
11d Restriction portion
11e Fixing portion
11f Engagement face
11g Restriction face
12 Side plate
12b Recess
16 Fastener
17 Sheet member
30 Housing
31 Bottom wall
32 Side wall
100 Battery module

The invention claimed is:

1. A battery module comprising: a battery cell group including a laminate of a plurality of flattened rectangular battery cells stacked in a thickness direction of the battery cells; and a housing storing the battery cell group,
wherein:
each of the battery cells has a pair of wide side faces facing the thickness direction of the battery cells, a pair of narrow side faces facing the width direction of the battery cells, and a bottom face and a top face facing a height direction of the battery cells,
the battery cell group including a plurality of cell holders configured to hold the individual battery cells from both sides in the thickness direction, and a plurality of side plates disposed at both ends of the plurality of battery cells in the width direction of the battery cells via the plurality of cell holders and fixed to the housing, and the battery cell group is stored in the housing so that the bottom faces of the plurality of battery cells abut or are close to and opposed to a side wall of the housing,
each of the cell holders having a restriction portion configured to restrict movement of the corresponding battery cell in a direction intersecting the thickness direction, side wall portions that abut and are opposed to the narrow side faces of the corresponding battery cell and fixing portions that engage with the side plates, each of the fixing portions of the cell holder projecting from the corresponding side wall portion in a direction opposite to the narrow side face of the battery cell,
the restriction portion of each of the cell holders extends in the thickness direction and in the width direction of the battery cells to abut and be opposed to the top face of the corresponding battery cell, and
each of the fixing portions of the cell holder has an engagement face that engages with an end face of the side plate and an end face that is close to and opposed to the side wall of the housing on a side opposite to the engagement face in the height direction of the battery cell.

2. The battery module according to claim 1, further comprising a sheet member interposed between the bottom faces of the plurality of battery cells and the side wall or the bottom wall of the housing.

3. The battery module according to claim 1, wherein the restriction portion of each of the cell holders extends in the thickness direction and in the width direction of the battery cells to abut and be opposed to the bottom face of the corresponding battery cell.

4. The battery module according to claim 1, wherein the battery cell group is fixed inside of the housing, and the fixing portions of each of the cell holders are fixed to the side plates of the battery cell group.

5. The battery module according to claim 1, wherein each of the cell holders has an engagement face and a restriction face parallel to each other, the engagement face is a face of the fixing portion to be opposed to the corresponding side plate, and the restriction face is a face of the restriction portion to be opposed to the bottom face of the battery cell.

6. The battery module according to claim 1, wherein the battery cell group includes fasteners configured to fasten the fixing portions of the cell holders to the side plates for fixing.

7. The battery module according to claim 1, wherein each of the cell holders has a planar portion that is opposed to the wide side face of the corresponding battery cell, and the planar portion, the restriction portion, the side wall portions, and the fixing portions of the cell holder are monolithic.

8. The battery module according to claim 1, wherein the side plates are made of metal.

9. The battery module according to claim 1, further comprising a sheet member interposed between the cell holders and each of the side plates.

* * * * *